3,323,924
LOW DIELECTRIC LOSS METALLIZING PAINT COMPOSITION HAVING A REDUCED SINTERING TEMPERATURE

Russell C. McRae, Santa Clara, and Leonard Reed, San Jose, Calif., assignors, by mesne assignments, to Varian Associates, a corporation of California
No Drawing. Filed Mar. 27, 1964, Ser. No. 355,410
7 Claims. (Cl. 106—1)

This invention relates to metalizing paints and more specifically to low dielectric loss, reduced sintering temperature, metalizing paint compositions which can be utilized to fabricate low dielectric loss ceramic-to-metal seals.

Ceramic-to-metal seals have found wide application in the electronics industry. However, before a ceramic body can be hermetically sealed to a metal or metallic body, it, in most cases, must first be metalized. This is generally accomplished by painting the portion of the ceramic body to be metalized with a metalizing paint and then heating the coated ceramic to sinter a refractory metal, present in the paint, onto the ceramic. The resulting metalized layer usually comprises a refractory metal phase which is extensively penetrated by a non-metallic "glassy" phase that wets and adheres to both the refractory metal and the ceramic body. The metalizing paint is applied to the ceramic body by hand painting, spraying, dipping, silk screening or by any other suitable means. After the metalizing is sintered onto the ceramic, the ceramic body is readily brazed to a metallic or metal body to form a hermetic seal therebetween. If desired, the metalized surface of the ceramic may be coated with a metal, such as copper or nickel, prior to the brazing step.

Some applications of ceramic-to-metal seal structures, such as ceramic windows located in waveguides and the like, not only require that the seal be vacuum tight, but that it also conduct high frequency electromagnetic energy. Experience has shown that such ceramic-to-metal seals produce electrical losses which can be classified into two groups, namely, conduction current losses caused by the presence of mobile charge carriers (mostly electrons) present in the seal area and dielectric losses caused by varying electric fields disturbing various ionic and molecular structures located at the seal area. It has been discovered that a majority of the dielectric losses are caused by the metalized layer on the ceramic and for a varying penetration distance into the ceramic, said penetration depending on the time and temperature of metalizing. It is also known that the dielectric losses attributed to the metalizing layer can be virtually eliminated by causing the "glassy" phase producing material in the metalizing paint to be limited to silica ($SiO_2$). Such a metalizing paint, however, has a high sintering temperature which tends to warp and crack ceramic bodies. Also, expensive apparatus, such as high temperature furnaces, etc. are required to produce the high sintering temperatures.

Accordingly, an object of this invention is to provide a metalizing paint that overcomes these and other disadvantages of the prior art.

Another object of this invention is to provide a low dielectric loss metalizing paint composition.

Still another object of this invention is to provide a low dielectric loss metalizing paint composition having a reduced sintering temperature.

These and other objects of the present invention are accomplished by a metalizing paint that includes a vehicle in which a mixture of powders is suspended. The major portion by weight, about 80%, of the metal powder mixture comprises a refractory metal, such as molybdenum, tungsten, rhenium, or the like. Successively smaller parts by weight of the powder mixture includes, respectively, silica and a material which reduces the sintering temperature of the metalizing paint which material is characterized as having a large ionic or molecular volume or structure.

These and other objects, features and advantages of the present invention will be readily apparent from consideration of the following detailed description.

According to a preferred example of the present invention, a low dielectric loss metalizing paint composition having a reduced sintering temperature is formed by preparing a vehicle which includes a binder and a solvent. A suitable solvent may comprise equal parts by volume of ethylene glycol mono-ethyl ether and methyl-ethyl ketone. A suitable vehicle may be obtained by adding by weight about 1.5 grams of a suitable binder, such as nitrocellulose, to 100 cc. by volume of the solvent.

A plurality of powders are then suspended in the vehicle and include a majority by weight of a refractory metal, such as molybdenum, tungsten, rhenium, columbium, platinum and the like, which is to be sintered onto a ceramic body. A "refractory metal," as used to describe and claim the subject invention, is a metallurgical term used to denote a group of metals that are resistant to high temperatures. Successively smaller amounts by weight of the powder mixture includes silica and a material which reduces the sintering temperature of the refractory metal-silica mixture which material is characterized as having a relatively large molecular volume or structure.

A refractory metal-silica metalizing paint composition produces very low dielectric losses when it is utilized to metalize a ceramic body that is sealed to a metal or metallic member to provide a ceramic-to-metal seal which is to conduct high frequency electromagnetic energy. However, such a refractory metal-silica metalizing paint composition has a high sintering temperature (about 1700° C.) which tends to warp and crack the ceramic bodies to which it is applied. Also, expensive apparatus, such as high temperature furnaces, are required to produce the high sintering temperatures. It is very desirable, therefore, that some means be found to reduce the sintering temperature of the metalizing paint composition without introducing excessive dielectric losses.

It has been found that oxides or carbonates of materials, such as manganese, titanium, iron and nickel, when applied to a refractory metal-silica metalizing paint composition, will reduce the sintering temperature of the metalizing paint. However, such materials cause the metalizing to have very high dielectric losses.

It has been discovered, however, that if a material, such as an oxide or carbonate of barium or strontium is added to a refractory metal-silica metalizing paint composition, it reduces the sintering temperature of the metalizing paint without introducing appreciable dielectric losses. For example, these materials reduced the metalizing dielectric losses to about one-tenth of their value when other materials, such as manganese, titanium, iron and nickel, were utilized to reduce the sintering temperature of the metalizing paint composition.

In accordance with a preferred embodiment of the present invention, a low dielectric loss metalizing paint having a reduced sintering temperature comprises a plurality of powders suspended in a vehicle, which powders consist essentially of about 80% by weight of a refractory metal selected from the group consisting of molybdenum, tungsten, rhenium, platinum and columbium, about 11 to 13% by weight of silica and 9 to 7% by weight of a material selected from the group consisting of an oxide or carbonate of barium and strontium. This metalizing paint composition has low dielectric losses, a sintering temperature of about 1400° C. and provides ceramic-to-metal seals that can withstand up to about 8,000 p.s.i. of tensile stresses.

When this metalizing paint is applied to a ceramic body and sintered thereto, the silica and barium, or silica and strontium, form a "glassy" phase material wherein the barium or strontium material is a silica glass network modifier that is physically immobilized in the structure of the "glassy" phase material. It is believed that the large molecular volume or structures of the barium and strontium, i.e., large as compared to the smaller molecular structures of manganese, titanium, iron, nickel, etc., are not readily disturbed by varying electric fields thereby causing them to introduce relatively little dielectric losses into a metalized ceramic body. Network modifiers having small molecular volumes or structures, such as manganese, titanium, iron and nickel, produce excessive dielectric losses when added to the paint composition to reduce the sintering temperature. It is believed that these excessive losses are due to the small molecular structures of these materials being more readily disturbed by fluctuating electric fields.

An especially satisfactory metalizing paint composition, in accordance with the present invention, comprises a plurality of powders suspended in a vehicle which powders consist essentially of about 80% by weight of molybdenum, about 12.6% by weight of silica and about 7.4% by weight of an oxide or carbonate of barium.

By using a majority by weight of the refractory metal in the metalizing paint composition, the metalized ceramic body is caused to have a dense layer of the refractory metal sintered thereto. Also, if the percentage part by weight of the sintering temperature reducing material (barium or strontium) is increased or decreased above or below the range given above, the sintering temperature of the metalizing paint composition increases. Further, increasing the percentage part by weight of the sintering temperature reducing material causes the metalized layer sintered onto a ceramic to be weak and brittle creating mechanically weak ceramic-to-metal seals when the metalized ceramic is brazed to a metal or metallic member.

What is claimed is:

1. A low dielectric loss metalizing paint composition consisting essentially of about 80% by weight of a refractory metal selected from the group consisting of molybdenum, tungsten, rhenium, platinum and columbium, and successively smaller parts by weight respectively of silica and a material selected from the group consisting of barium carbonate, an oxide of barium, strontium carbonate and an oxide of strontium.

2. The combination according to claim 1 wherein said refractory metal is in its elemental form.

3. A low dielectric loss metalizing paint composition consisting essentially of a plurality of powders suspended in a vehicle, said powders consisting essentially of about 80% by weight of a refractory metal selected from the group consisting of molybdenum, tungsten, rhenium, platinum and columbium, about 11 to 13% by weight of silica and about 9 to 7% by weight of a material selected from the group consisting of barium and strontium.

4. The combination according to claim 3 wherein said refractory metal is in oxide form.

5. The combination according to claim 3 wherein said barium material is barium carbonate.

6. A low dielectric loss metalizing paint composition consisting essentially of: a plurality of powders suspended in a vehicle, said powders including about 80% by weight of a refractory metal selected from the group consisting of molybdenum, tungsten, rhenium, platinum and columbium, about 12.6% by weight of silica and about 7.4% by weight of a material selected from the group consisting of barium carbonate an oxide of barium, strontium carbonate and an oxide of strontium.

7. A low dielectric loss metalizing paint composition consisting essentially of: a plurality of powders suspended in a vehicle, said powders consisting essentially of about 80% by weight of molybdenum, about 12.6% by weight of silica and about 7.4% by weight of barium carbonate.

References Cited

UNITED STATES PATENTS

| | | | |
|---|---|---|---|
| 2,442,864 | 6/1948 | Schneider | 106—193 XR |
| 2,461,878 | 2/1949 | Christensen et al. | |
| 2,488,731 | 11/1949 | Lambert et al. | 106—193 XR |
| 2,530,217 | 11/1950 | Bain | 106—193 XR |
| 2,928,755 | 3/1960 | Brandstad et al. | 117—22 |
| 2,996,795 | 8/1961 | Stout | 29—195 |
| 3,029,559 | 4/1962 | Treptow | 29—195 |
| 3,093,490 | 6/1963 | Mackey | 106—1 |
| 3,110,571 | 11/1963 | Alexander | 117—22 X |

ALEXANDER H. BRODMERKEL, *Primary Examiner.*

J. H. WOO, *Assistant Examiner.*